(12) United States Patent
Allard (10) Patent No.: US 10,914,505 B2
(45) Date of Patent: Feb. 9, 2021

(54) VACUUM INSULATED DOOR CONSTRUCTION

(71) Applicant: WHIRLPOOL CORPORATION, Benton Harbor, MI (US)

(72) Inventor: Paul B. Allard, Coloma, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 16/438,685

(22) Filed: Jun. 12, 2019

(65) Prior Publication Data

US 2019/0293338 A1 Sep. 26, 2019

Related U.S. Application Data

(62) Division of application No. 14/976,355, filed on Dec. 21, 2015, now Pat. No. 10,422,569.

(51) Int. Cl.
| | | |
|---|---|---|
| *F25D 23/02* | (2006.01) | |
| *B23B 5/18* | (2006.01) | |

(Continued)

(52) U.S. Cl.
CPC .............. *F25D 23/02* (2013.01); *B32B 1/00* (2013.01); *B32B 3/04* (2013.01); *B32B 3/08* (2013.01);

(Continued)

(58) Field of Classification Search
CPC .... F25D 23/02; F25D 23/028; F25D 2201/14; F25D 2201/1262
See application file for complete search history.

(56) References Cited

U.S. PATENT DOCUMENTS

| 948,541 A | 2/1910 | Coleman |
|---|---|---|
| 1,275,511 A | 8/1918 | Welsch |

(Continued)

FOREIGN PATENT DOCUMENTS

| CA | 626838 A | 5/1961 |
|---|---|---|
| CA | 1320631 | 7/1993 |

(Continued)

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

(Continued)

*Primary Examiner* — Andrew M Roersma
(74) *Attorney, Agent, or Firm* — Price Heneveld LLP (57) ABSTRACT

A method of fabricating a refrigerator cabinet or door includes forming a wrapper and an inner liner. The method further includes forming a vacuum insulated core comprising a permeable core material that is disposed inside an impermeable envelope. A sheet of prefabricated compressible foam material is positioned between the vacuum insulated core between the inner door liner and/or the door wrapper. The prefabricated compressible foam material may be cut from a sheet of foam having substantially uniform thickness prior to fabrication of the refrigerator door. The foam compresses to accommodate differences in spacing between the vacuum insulated core and the door wrapper and/or the door liner.

19 Claims, 4 Drawing Sheets

(51) Int. Cl.
  B23B 3/08 (2006.01)
  B23B 3/28 (2006.01)
  B23B 1/00 (2006.01)
  B23B 3/04 (2006.01)
  B23B 3/26 (2006.01)
  B23B 7/12 (2006.01)
  B23B 27/06 (2006.01)
  B32B 5/18 (2006.01)
  B32B 3/08 (2006.01)
  B32B 3/18 (2006.01)
  B32B 3/28 (2006.01)
  B32B 1/00 (2006.01)
  B32B 3/04 (2006.01)
  B32B 3/26 (2006.01)
  B32B 7/12 (2006.01)
  B32B 15/04 (2006.01)
  B32B 15/18 (2006.01)
  B32B 27/06 (2006.01)

(52) U.S. Cl.
  CPC ............... *B32B 3/18* (2013.01); *B32B 3/266* (2013.01); *B32B 3/28* (2013.01); *B32B 5/18* (2013.01); *B32B 7/12* (2013.01); *B32B 15/046* (2013.01); *B32B 15/18* (2013.01); *B32B 27/065* (2013.01); *F25D 23/021* (2013.01); *B32B 2250/05* (2013.01); *B32B 2262/101* (2013.01); *B32B 2264/102* (2013.01); *B32B 2266/025* (2013.01); *B32B 2266/0221* (2013.01); *B32B 2266/0278* (2013.01); *B32B 2307/304* (2013.01); *B32B 2307/50* (2013.01); *B32B 2307/58* (2013.01); *B32B 2307/732* (2013.01); *B32B 2509/10* (2013.01); *F25D 2201/1262* (2013.01); *F25D 2201/14* (2013.01); *F25D 2323/021* (2013.01); *F25D 2331/806* (2013.01); *F25D 2400/36* (2013.01)

(56) References Cited

U.S. PATENT DOCUMENTS

| | | |
|---|---|---|
| 1,849,369 A | 3/1932 | Frost |
| 1,905,853 A | 4/1933 | Griffiths |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schiff |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |

(56) References Cited

U.S. PATENT DOCUMENTS

| | | |
|---|---|---|
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A * | 7/1997 | Tremain .............. B32B 3/04 428/121 |
| 5,716,581 A | 2/1998 | Tirrell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Messer et al. |
| 5,827,385 A | 10/1998 | Meyer et al. |
| 5,834,126 A | 11/1998 | Sheu |
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A * | 12/2000 | Dietrich .............. F16L 59/12 52/406.2 |
| 6,164,739 A | 12/2000 | Schulz et al. |
| 6,168,040 B1 * | 1/2001 | Sautner .............. F16L 59/065 220/592.1 |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur |
| 8,733,123 B2 | 5/2014 | Adamski et al. |
| 8,739,567 B2 | 6/2014 | Junge |

(56) References Cited

U.S. PATENT DOCUMENTS

| | | | |
|---|---|---|---|
| 8,739,568 B2 | 6/2014 | Allard et al. |
| 8,752,918 B2 | 6/2014 | Kang |
| 8,752,921 B2 | 6/2014 | Gortz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,955,352 B2 | 2/2015 | Lee et al. |
| 8,986,483 B2 | 3/2015 | Cur |
| 9,009,969 B2 | 4/2015 | Choi et al. |
| RE45,501 E | 5/2015 | Maguire |
| 9,038,403 B2 | 5/2015 | Cur et al. |
| 9,056,952 B2 | 6/2015 | Eilbracht et al. |
| 9,071,907 B2 | 6/2015 | Kuehl et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matasubara et al. |
| 2002/0114937 A1 | 8/2002 | Albert et al. |
| 2002/0144448 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Roller et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1* | 11/2012 | Katu ............... F25C 5/22 62/344 |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |

(56) References Cited

U.S. PATENT DOCUMENTS

| | | | |
|---|---|---|---|
| 2013/0256318 A1 | 10/2013 | Kuehl et al. | |
| 2013/0256319 A1 | 10/2013 | Kuehl et al. | |
| 2013/0257256 A1 | 10/2013 | Allard et al. | |
| 2013/0257257 A1 | 10/2013 | Cur et al. | |
| 2013/0264439 A1 | 10/2013 | Allard et al. | |
| 2013/0270732 A1* | 10/2013 | Wu | B29C 51/02 264/101 |
| 2013/0285527 A1 | 10/2013 | Choi et al. | |
| 2013/0293080 A1 | 11/2013 | Kim et al. | |
| 2013/0305535 A1 | 11/2013 | Cur et al. | |
| 2013/0328472 A1 | 12/2013 | Shim et al. | |
| 2014/0009055 A1 | 1/2014 | Cho et al. | |
| 2014/0097733 A1 | 4/2014 | Seo et al. | |
| 2014/0132144 A1 | 5/2014 | Kim et al. | |
| 2014/0166926 A1 | 6/2014 | Lee et al. | |
| 2014/0171578 A1 | 6/2014 | Meyer et al. | |
| 2014/0190978 A1 | 7/2014 | Bowman et al. | |
| 2014/0196305 A1 | 7/2014 | Smith | |
| 2014/0216706 A1 | 8/2014 | Melton et al. | |
| 2014/0232250 A1 | 8/2014 | Kim et al. | |
| 2014/0260332 A1 | 9/2014 | Wu | |
| 2014/0346942 A1 | 11/2014 | Kim et al. | |
| 2014/0364527 A1 | 12/2014 | Mathias et al. | |
| 2015/0011668 A1 | 1/2015 | Kolb et al. | |
| 2015/0015133 A1 | 1/2015 | Carbajal et al. | |
| 2015/0017386 A1 | 1/2015 | Kolb et al. | |
| 2015/0027628 A1 | 1/2015 | Cravens et al. | |
| 2015/0059399 A1 | 3/2015 | Hwang et al. | |
| 2015/0115790 A1 | 4/2015 | Ogg | |
| 2015/0147514 A1 | 5/2015 | Shinohara et al. | |
| 2015/0159936 A1 | 6/2015 | Oh et al. | |
| 2015/0168050 A1 | 6/2015 | Cur et al. | |
| 2015/0176888 A1 | 6/2015 | Cur et al. | |
| 2015/0184923 A1 | 7/2015 | Jeon | |
| 2015/0190840 A1 | 7/2015 | Muto et al. | |
| 2015/0224685 A1 | 8/2015 | Amstutz | |
| 2015/0241114 A1* | 8/2015 | Wu | F25D 23/028 428/69 |
| 2015/0241115 A1 | 8/2015 | Strauss et al. | |
| 2015/0241118 A1 | 8/2015 | Wu | |
| 2015/0285551 A1 | 10/2015 | Aiken et al. | |
| 2016/0084567 A1 | 3/2016 | Fernandez et al. | |
| 2016/0116100 A1 | 4/2016 | Thiery et al. | |
| 2016/0123055 A1 | 5/2016 | Ueyama | |
| 2016/0161175 A1 | 6/2016 | Benold et al. | |
| 2016/0178267 A1 | 6/2016 | Hao et al. | |
| 2016/0178269 A1 | 6/2016 | Hiemeyer et al. | |
| 2016/0235201 A1 | 8/2016 | Soot | |
| 2016/0240839 A1 | 8/2016 | Umeyama et al. | |
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0038126 A1 | 2/2017 | Lee et al. | |
| 2017/0157809 A1 | 6/2017 | Deka et al. | |
| 2017/0176085 A1 | 6/2017 | Allard | |
| 2017/0176086 A1 | 6/2017 | Kang | |
| 2017/0184339 A1 | 6/2017 | Liu et al. | |
| 2017/0191746 A1 | 7/2017 | Seo | |

FOREIGN PATENT DOCUMENTS

| | | | | |
|---|---|---|---|---|
| CA | 2259665 | | 1/1998 | |
| CA | 2640006 | | 8/2007 | |
| CN | 1158509 | | 7/2004 | |
| CN | 1970185 | | 5/2007 | |
| CN | 100359272 | | 1/2008 | |
| CN | 101437756 | | 5/2009 | |
| CN | 201680116 | | 12/2010 | |
| CN | 201748744 U | | 2/2011 | |
| CN | 102452522 | | 5/2012 | |
| CN | 102717578 A | | 10/2012 | |
| CN | 102720277 | | 10/2012 | |
| CN | 103072321 | | 5/2013 | |
| CN | 202973713 U | | 6/2013 | |
| CN | 203331442 | | 12/2013 | |
| CN | 104816478 A | | 8/2015 | |
| CN | 105115221 | | 12/2015 | |
| CN | 204963379 U | | 1/2016 | |
| DE | 1150190 | | 6/1963 | |
| DE | 4110292 A1 | | 10/1992 | |
| DE | 4409091 | | 9/1995 | |
| DE | 19818890 | | 11/1999 | |
| DE | 19914105 | | 9/2000 | |
| DE | 19915311 | | 10/2000 | |
| DE | 102008026528 A | | 5/2009 | |
| DE | 102009046810 | | 5/2011 | |
| DE | 102010024951 | | 12/2011 | |
| DE | 102011051178 A1 | | 12/2012 | |
| DE | 102012221010 A1 * | | 5/2014 | F16L 59/065 |
| DE | 102012223536 | | 6/2014 | |
| DE | 102012223541 | | 6/2014 | |
| EP | 0260699 | | 3/1988 | |
| EP | 0480451 | | 4/1992 | |
| EP | 0645576 A1 | | 3/1995 | |
| EP | 0691518 | | 1/1996 | |
| EP | 0860669 | | 8/1998 | |
| EP | 1087186 | | 3/2001 | |
| EP | 1200785 | | 5/2002 | |
| EP | 1243880 | | 9/2002 | |
| EP | 1496322 | | 1/2005 | |
| EP | 1505359 | | 2/2005 | |
| EP | 1602425 A1 | | 12/2005 | |
| EP | 1624263 A2 | | 8/2006 | |
| EP | 1484563 | | 10/2008 | |
| EP | 2543942 A2 | | 1/2013 | |
| EP | 2607073 A2 | | 6/2013 | |
| EP | 2865972 A2 | | 8/2014 | |
| EP | 2789951 | | 10/2014 | |
| EP | 2878427 A1 | | 6/2015 | |
| FR | 2980963 | | 4/2013 | |
| FR | 2991698 A1 | | 12/2013 | |
| GB | 837929 | | 6/1960 | |
| GB | 1214548 | | 6/1960 | |
| JP | 4828353 | | 8/1973 | |
| JP | 51057777 | | 5/1976 | |
| JP | 59191588 | | 12/1984 | |
| JP | 61116274 A | | 6/1986 | |
| JP | 01219486 A | | 9/1989 | |
| JP | 03013779 | | 1/1991 | |
| JP | 04165197 | | 10/1992 | |
| JP | 04309778 A | | 11/1992 | |
| JP | 06159922 | | 6/1994 | |
| JP | 7001479 | | 1/1995 | |
| JP | 07167377 | | 4/1995 | |
| JP | 08300052 | | 11/1996 | |
| JP | 08303686 A | | 11/1996 | |
| JP | 09166271 A1 | | 6/1997 | |
| JP | 10113983 | | 5/1998 | |
| JP | 11159693 A | | 6/1999 | |
| JP | 11311395 | | 11/1999 | |
| JP | 11336990 | | 12/1999 | |
| JP | 2000097390 | | 4/2000 | |
| JP | 2000117334 | | 4/2000 | |
| JP | 2000320958 A | | 11/2000 | |
| JP | 2001038188 | | 2/2001 | |
| JP | 2001116437 A | | 4/2001 | |
| JP | 2001336691 A | | 12/2001 | |
| JP | 2001343176 | | 12/2001 | |
| JP | 2002068853 | | 3/2002 | |
| JP | 2004303695 | | 10/2004 | |
| JP | 2005069596 A | | 3/2005 | |
| JP | 2005098637 A | | 4/2005 | |
| JP | 2005114015 | | 4/2005 | |
| JP | 2005147591 A * | | 6/2005 | |
| JP | 2005164193 | | 6/2005 | |
| JP | 2005256849 A | | 9/2005 | |
| JP | 2006077792 A | | 3/2006 | |
| JP | 2006161834 A | | 6/2006 | |
| JP | 2006161945 | | 6/2006 | |
| JP | 03792801 | | 7/2006 | |
| JP | 2006200685 A | | 8/2006 | |
| JP | 2007263186 | | 10/2007 | |
| JP | 4111096 | | 7/2008 | |

(56) References Cited

FOREIGN PATENT DOCUMENTS

| | | |
|---|---|---|
| JP | 2008157431 A | 7/2008 |
| JP | 20081900815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 A | 4/2010 |
| JP | 2010108199 | 5/2010 |
| JP | 2010145002 | 7/2010 |
| JP | 2010236770 | 10/2010 |
| JP | 2010276309 | 12/2010 |
| JP | 2011002033 | 1/2011 |
| JP | 2011069612 A | 4/2011 |
| JP | 04779684 | 9/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 A | 9/2013 |
| JP | 2014037931 A | 2/2014 |
| JP | 2015007498 A | 1/2015 |
| KR | 20020057547 | 7/2002 |
| KR | 20020080938 | 10/2002 |
| KR | 20030083812 | 11/2003 |
| KR | 20040000126 | 1/2004 |
| KR | 100620025 B1 | 9/2006 |
| KR | 1020070044024 | 4/2007 |
| KR | 1020050126499 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 9721767 | 6/1997 |
| WO | 1998049506 A1 | 11/1998 |
| WO | 02060576 A1 | 4/1999 |
| WO | 9920961 A1 | 4/1999 |
| WO | 9920964 A1 | 4/1999 |
| WO | 200160598 | 8/2001 |
| WO | 200202987 | 1/2002 |
| WO | 2002052208 | 5/2002 |
| WO | 03072684 A1 | 9/2003 |
| WO | 03089729 | 10/2003 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | WO-2011058678 A1 * | 5/2011 ............ F25D 23/02 |
| WO | 2011081498 | 7/2011 |
| WO | 2012023705 | 2/2012 |
| WO | 2012026715 | 3/2012 |
| WO | 2012031885 | 3/2012 |
| WO | 2012043990 A2 | 4/2012 |
| WO | 2012044001 A2 | 4/2012 |
| WO | 2012085212 A2 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

Cai et al., "Generation of Metal Nanoparticles by Laser Ablation of Microspheres," J. Aerosol Sci., vol. 29, No. 5/6 (1998), pp. 627-636.

Raszewski et al., Methods for Producing Hollow Glass Microspheres, Powerpoint, cached from Google, Jul. 2009, 6 pages.

KitchenAid, "Refrigerator User Instructions," Sep. 5, 2015, 120 pages.

* cited by examiner

VACUUM INSULATED DOOR CONSTRUCTION

CROSS-REFERENCE TO RELATED APPLICATION

This application is a divisional of U.S. patent application Ser. No. 14/976,355, filed Dec. 21, 2015, and entitled "VACUUM INSULATED DOOR CONSTRUCTION," now U.S. Pat. No. 10,422,569, the entire disclosure of which is hereby incorporated herein by reference.

BACKGROUND OF THE INVENTION

Refrigerators typically include a refrigerated cabinet having one or more openings that can be selectively closed off by doors that are movably mounted to the cabinet. The doors are typically insulated, and seal off the openings when in a closed position. A known type of construction utilized in fabricating refrigerator cabinets and doors includes an outer wrapper and inner liner having an interior cavity or space that is filled with insulating foam. The foam may comprise a polyurethane foam that is injected into the space after the wrapper and liner are interconnected. The foam expands to fill the interior space prior to curing.

Another type of insulated cabinet construction includes vacuum insulated internal panels. Vacuum insulated panels provide improved insulating properties whereby the cabinet walls can be thinner, yet retain the same insulation properties. However, known vacuum insulated refrigerator cabinet and door constructions may suffer from various drawbacks.

SUMMARY OF THE INVENTION

A method of fabricating a refrigerator cabinet or door includes forming a wrapper having a peripheral edge portion. An inner liner having a peripheral edge portion is also formed. The wrapper and liner may comprise an outer door panel ("door wrapper") and an inner door liner. The method further includes forming a vacuum insulated core comprising a permeable core material that is disposed inside an impermeable envelope. The envelope is evacuated to form a vacuum inside the envelope. A sheet of prefabricated compressible foam material is positioned between the vacuum insulated core between at least one of the inner door liner and the door wrapper. The method includes securing at least a portion of the peripheral edge portion of the door wrapper to the peripheral edge portion of the inner door liner with the vacuum insulated core positioned between the door wrapper and the inner door liner. The prefabricated compressible foam material may be cut from a sheet of foam having substantially uniform thickness prior to fabrication of the refrigerator door. The foam compresses to accommodate differences in spacing between the vacuum insulated core and the door wrapper and/or the door liner. Because the space between the vacuum insulated core and the wrapper and the space between the insulated core and the liner is preferably quite small to provide a thinner door construction, it is difficult to inject conventional foams (e.g. polyurethane) into this limited space. The use of a prefabricated compressible foam sheet eliminates gaps that would otherwise exist, and also provides support for the wrapper and/or liner to reduce flexing/bending that could otherwise occur due to a gap between, for example, the door wrapper and the vacuum insulated core.

These and other features, advantages, and objects of the present disclosure will be further understood and appreciated by those skilled in the art by reference to the following specification, claims, and appended drawings.

BRIEF DESCRIPTION OF THE DRAWINGS

FIG. 3;

FIG. 1.

DETAILED DESCRIPTION

Figure 1:
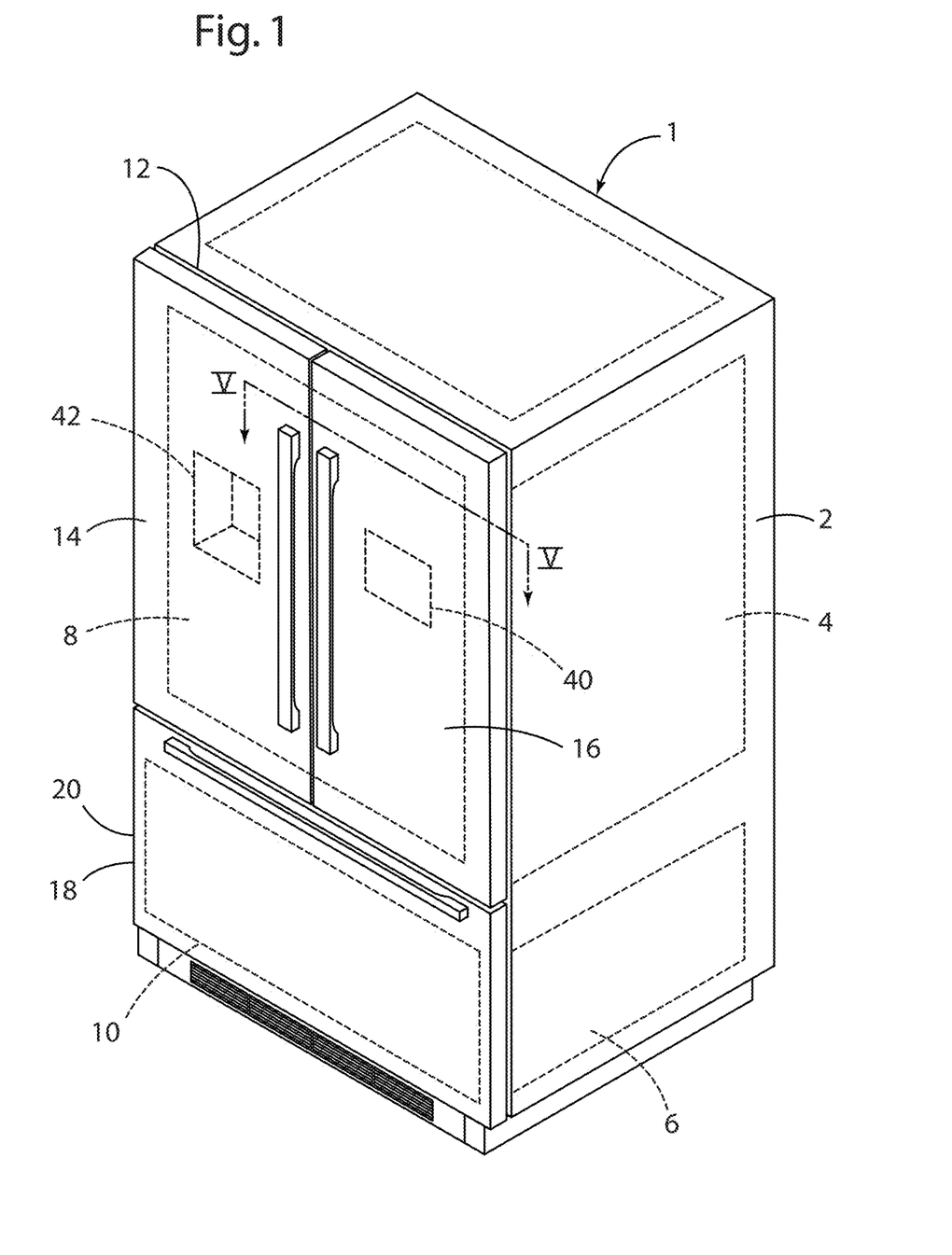
FIG. 1 is an isometric view of a refrigerator.

For purposes of description herein, the terms "upper," "lower," "right," "left," "rear," "front," "vertical," "horizontal," and derivatives thereof shall relate to the invention as oriented in FIG. 1. However, it is to be understood that the disclosed subject matter may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes an insulated cabinet 2 having internal spaces 4 and 6 with openings 8 and 10, respectively on a front side 12 of cabinet 2. In the illustrated example, the interior space 4 comprises a fresh food refrigerated space that can be accessed by opening one or both doors 14 and 16, and the interior space 6 comprises a freezer compartment that can be accessed by opening drawer 18. Drawer 18 includes an insulated front panel 20. It will be understood that the term "door" as used herein generally refers to a movable door (e.g. doors 14 and 16) or an insulated panel 20 on a movable drawer 18. It will be understood that the construction/method of fabricating door 16 as described herein is equally applicable to the door 14 and front panel 20 of drawer 18.

Figure 2:
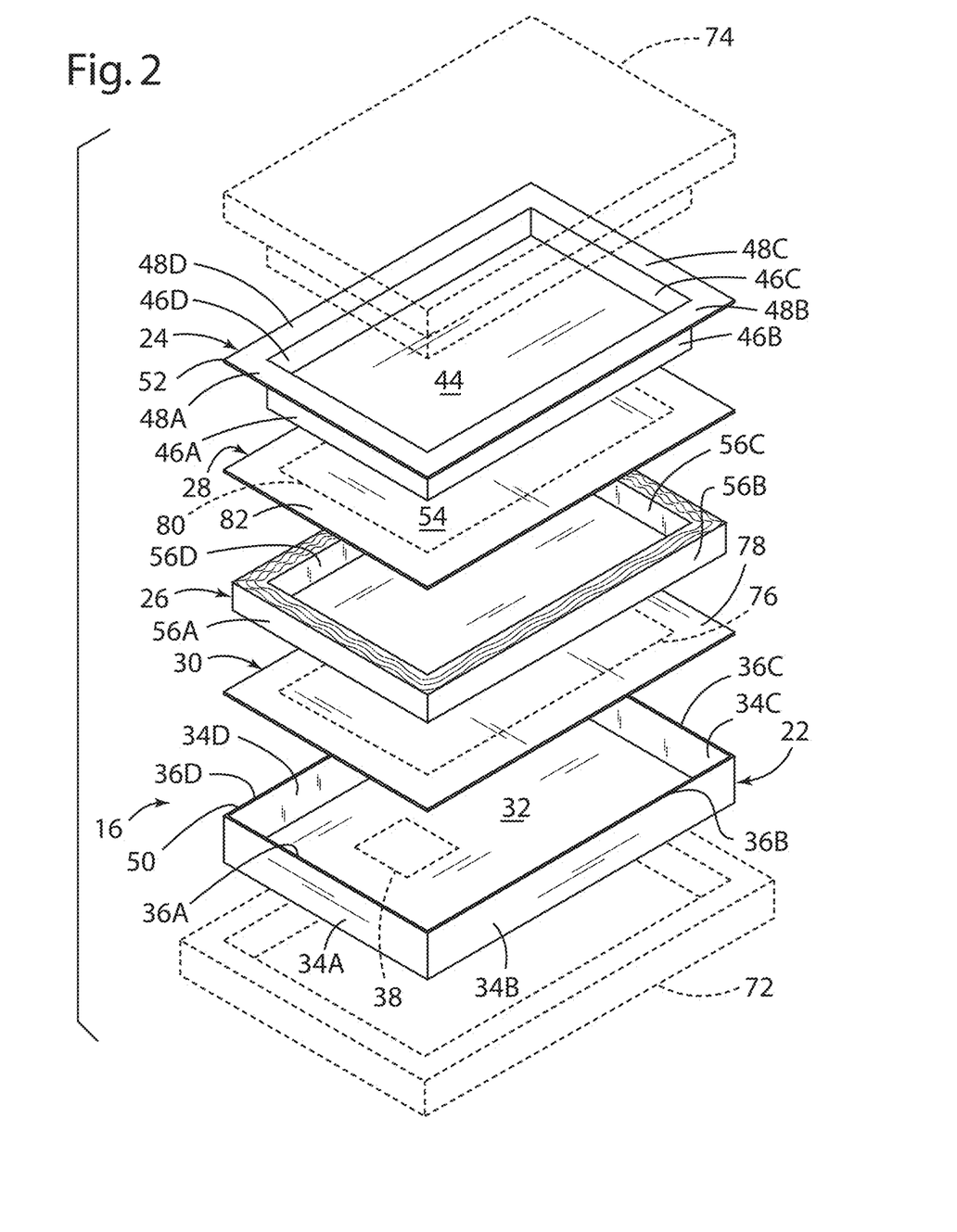
FIG. 2 is an exploded isometric view showing a refrigerator door having a vacuum insulated core and one or more prefabricated foam sheets.

With further reference to FIG. 2, door 16 includes an outer skin or wrapper 22, a liner 24 and a vacuum insulated core 26. As discussed in more detail below, a prefabricated foam sheet 28 may be positioned between liner 24 and vacuum insulated core 26. A prefabricated foam sheet 30 may also be positioned between the wrapper 22 and vacuum insulated core 26. Door 16 may include only foam sheet 28, only foam sheet 30, or both foam sheets 28 and 30.

Outer wrapper 22 may comprise sheet metal or polymer that is formed to provide a desired 3D shape utilizing known processes. The wrapper 22 may include a central area 32 that is generally planar, and side walls 34A-34D that extend transversely from the central area 32. The side walls 34A-34D may include inwardly-extending flanges 36A-36D that are configured to interconnect with liner 24. The wrapper 22 may optionally include one or more openings 38 that may be utilized to mount a user display 40 and/or an ice and/or water dispenser 42 (FIG. 1).

Liner 24 is preferably made by thermoforming a sheet of polymer material utilizing known thermoforming. Liner 24 may also be made utilizing an injection molding process. The liner 24 includes a central portion 44 and sidewall portions 46A-46D. The side walls 46A-46D may include connecting structures or flanges 48A-48D that are configured to engage the flanges 36A-36D and/or side walls 34A-34D of wrapper 22. The configurations of the peripheral edge portions 50 and 52 of wrapper 22 and liner 24 may have various known configurations, and are generally configured to be interconnected to one another in a known manner.

Figure 3:
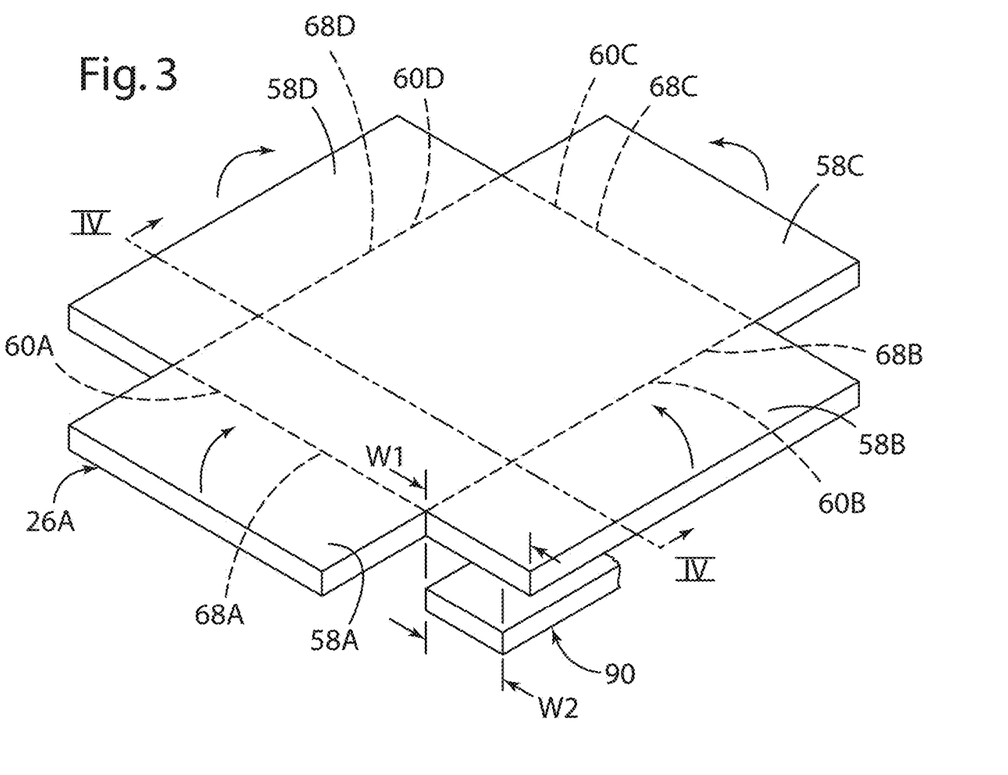
FIG. 3 is an isometric view showing a vacuum insulated core prior to folding into a three dimensional shape as shown in FIG. 2.
Figure 4:
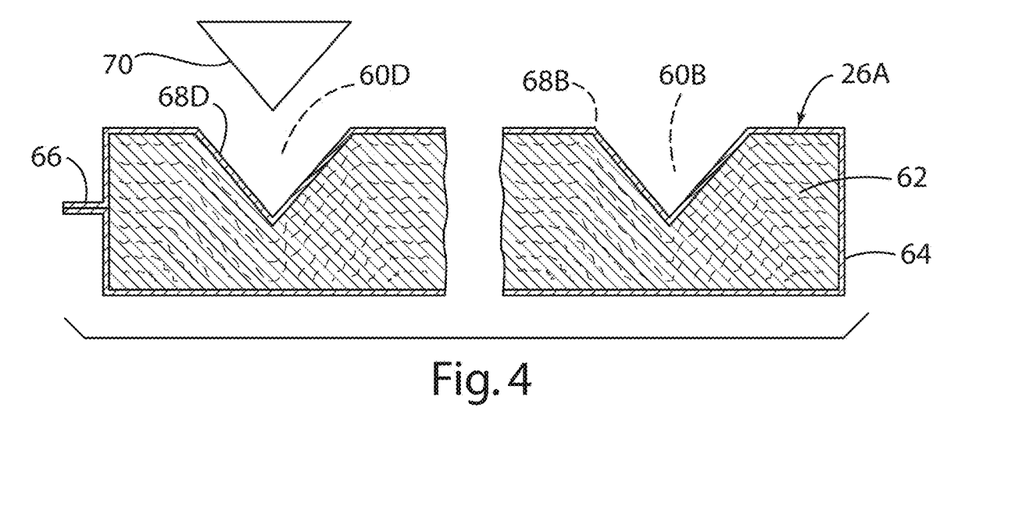
FIG. 4 is a fragmentary cross sectional view taken along the line IV-IV.

The vacuum insulated core 26 may include a central area 54 and side walls 56A-56D. With further reference to FIGS. 3 and 4, the vacuum insulated core 26 may be fabricated from a flat sheet of core material 26A having flaps 58A-58D that are folded along fold lines 60A-60D, respectively to form side walls 56A-56D, respectively. With reference to FIG. 4, the panel 26A comprises a permeable core material 62 that is disposed inside an impermeable envelope 64 that is sealed along a seam 66. The envelope 64 is evacuated to form a vacuum. In a preferred embodiment, the core material comprises fiberglass, silica powder, or other suitable material, and the envelope 64 comprises one or more layers of foil and/or polymer. V-shaped notches 68A-68D may be formed utilizing a V-shaped forming tool 70 to thereby provide fold lines 60A-60D. As discussed in more detail below, additional layers of core material 90 may be utilized to provide increased thickness in specific regions if required for a particular application.

Referring again to FIG. 2, the vacuum insulated core 26 is configured to fit closely within wrapper 22, with side walls 56A-56D of vacuum insulated core 26 being disposed directly adjacent, but inside side walls 34A-34D, respectively, of wrapper 22. Liner 24 is configured to fit within vacuum insulated core 26 in a nesting manner, with central portion 44 of liner 24 disposed immediately adjacent central area 54 of vacuum insulated core 26, and with side walls 46A-46D of liner 24 being disposed adjacent and inside of, side walls 56A-56D of vacuum insulated core 26.

Due to manufacturing tolerances, and the like, gaps may be present in at least some regions between liner 24 and vacuum insulated core 26. Similarly, gaps may also exist between wrapper 22 and vacuum insulated core 26 in some regions. To account for such gaps, prefabricated foam sheet 28 and/or prefabricated sheet 30 may be positioned between vacuum insulated core 26 and liner 24 and/or between vacuum insulated core 26 and wrapper 22. The prefabricated foam sheets 28 and 30 preferably comprise a compressible foam material having a thickness of about 0.060-1.0 inches, and more preferably about 0.125-0.375 inches. The foam sheets 28 and 30 may comprise a known foam material that is prefabricated in sheets having uniform thickness, and the sheets 28 and 30 may be cut to size as required for a particular application. Examples of suitable foam materials include polyethylene, EVA (Ethylene-vinyl acetate) and polyurethane. The prefabricated foam sheets 28 and 30 preferably have sufficient stiffness to significantly reduce or prevent flexing of liner 24 and/or wrapper 22, respectively if a user applies an out of plane force to the liner 24 or wrapper 22. However, prefabricated foam sheets 28 and 30 also preferably have sufficient resilience/compressibility to permit some compression during the assembly process to thereby account for variations in the gap between liner 24 and core 26, and variations in the gap between wrapper 22 and core 26. Typically, the gaps between the components are selected to be the same size or smaller than the thicknesses of sheets 28 and 30 even if the gaps are at a maximum possible size due to tolerances in the components such that sheets 28 and 30 are compressed at least somewhat and completely fill the gaps.

During assembly, the wrapper 22 may be positioned in a lower tool or fixture 72. If a prefabricated foam sheet 30 is to be installed between vacuum insulated core 26 and wrapper 22, the prefabricated foam sheet 30 is cut to size. The prefabricated foam sheet may optionally be adhesively attached to the wrapper 22 and/or the vacuum insulated core 26. The adhesive may comprise hot melt adhesive, two-part adhesive, or other suitable adhesive. The prefabricated foam sheet 30 may be sized and configured such that an edge portion 78 of foam sheet 30 is folded along a rectangular fold line 76 during assembly whereby the edge portion 76 is disposed between side walls 34A-34D of wrapper 22 and side walls 56A-56D of vacuum insulated core 26. It will be understood that the prefabricated foam sheet 30 may be cut to remove corner portions of sheet 30 to form flaps to prevent bunching/overlap at the corners in a manner that is similar to the flaps 58A-58D of vacuum insulated core material 26A as shown in FIG. 3.

If a prefabricated foam sheet 28 is to be utilized in the assembly process, the foam sheet 28 is cut to size, and positioned between liner 24 and vacuum insulated core 26. The foam sheet 28 may be adhesively secured to liner 24 and/or to vacuum insulated core 26. The adhesive may comprise hot melt adhesive, two-part adhesive, or other suitable adhesive. The foam sheet 28 may also be cut and folded along fold line 80, whereby the edge portion 82 of prefabricated foam sheet 28 may be positioned between side walls 56A-56D of vacuum insulated core 26, and side walls 46A-46D of liner 24.

An upper tool or fixture 74 may then be utilized to press the wrapper 22 and liner 24 together. The lower tool 72 and upper tool 74 may be configured to ensure that the peripheral edge portions 50 and 52 of wrapper 22 and liner 24 are engaged with one another. The peripheral edge portions 50 and 52 may be sealed and/or interconnected utilizing various suitable known techniques. The assembled door may then be removed from the fixtures 72 and 74.

Figure 5:
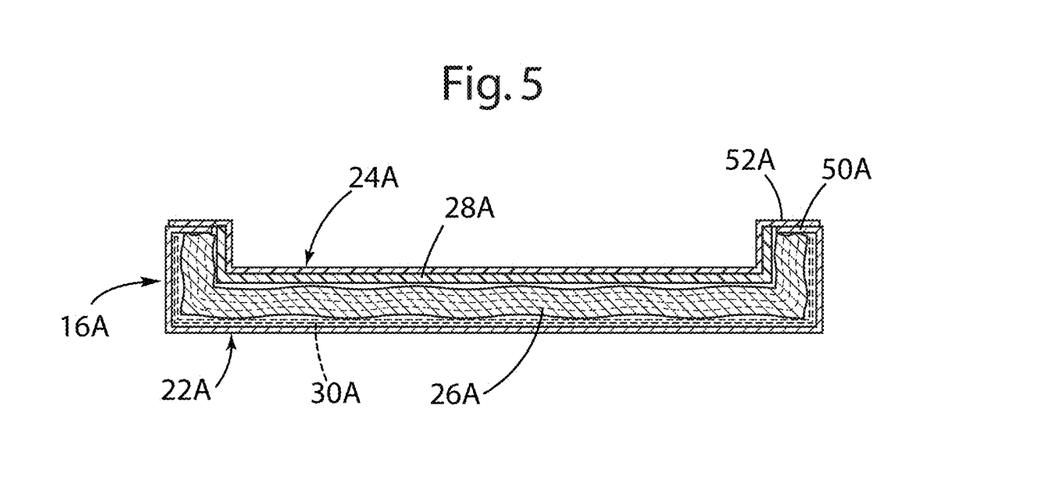
FIG. 5 is a partially schematic cross sectional view of the refrigerator door taken along the line V-V.

With reference to FIG. 5, a door 16A includes a wrapper 22A, liner 24A, and a vacuum insulated core 26A. The door 16A includes a prefabricated foam sheet 28A, and may also optionally include a prefabricated foam sheet 30A. The wrapper 22A is preferably formed from sheet metal (e.g. stainless steel) utilizing known metal forming processes, and the inner liner 24A is formed from a polymer material. The liner 24A may be fabricated by thermoforming a sheet of polymer material. The peripheral edge portion 50A of wrapper 22A comprises an inwardly-extending flange. The peripheral edge portion of liner 24A comprises an outwardly-extending flange 52A that overlaps the flange 50A of wrapper 22A. During assembly, the flanges forming the peripheral edges 50A and 52 are interconnected and sealed utilizing known processes.

Figure 6:
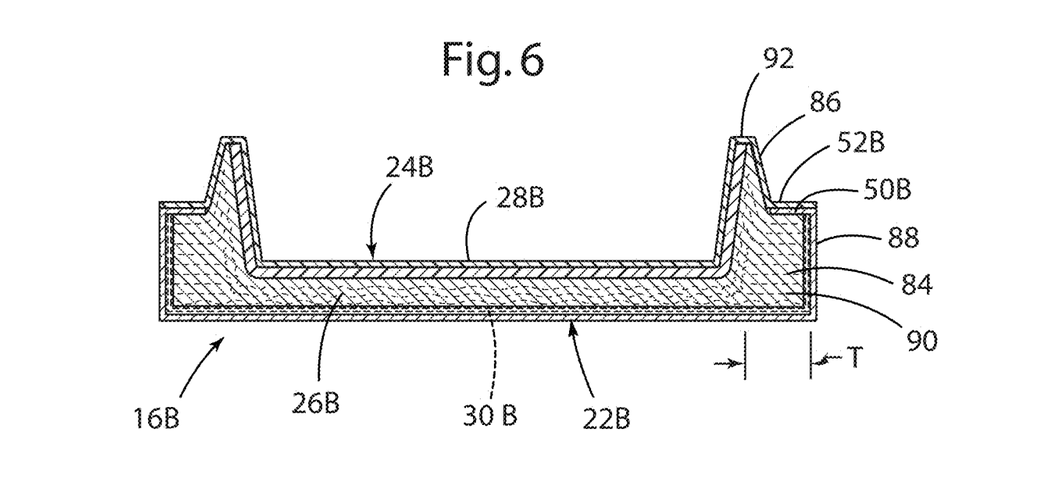
FIG. 6 is a partially schematic cross sectional view of a refrigerator door having a vacuum insulated core and preformed foam sheet.

With further reference to FIG. 6, a refrigerator door 16B includes a metal wrapper 22B, and a polymer liner 24B. Liner 24B may be formed from a sheet of polymer material utilizing a thermoforming process. A prefabricated foam sheet 28B is positioned between the liner 24B and the vacuum insulated core 26B. A prefabricated foam sheet 26B may optionally be positioned between wrapper 22B and vacuum insulated core 26B. The vacuum insulated core 26B includes side wall portions 84 and 86. The side wall portions 84 have an increased thickness "T," and fit within side walls 88 of wrapper 22B. The increased thickness of side wall 84 may be formed by stacking an additional strip 90 (FIG. 3) of vacuum insulated core material to the side walls of the vacuum insulated core 26B. The end portion 86 of the side wall may comprise a single layer of vacuum insulated core material. For example, the flaps 58A-58D (FIG. 3) may have a width "W1," and the strips 90 may have a width "W2" that is significantly less than the width "W1."

Referring again to FIG. 6, the liner 24 may include an end portion 92 that is U-shaped or J-shaped, whereby the end portion 92 extends around the end portion 86 of the side walls of vacuum insulated core 26. During assembly, the peripheral edge portion 50B of wrapper 22B is sealed/attached to peripheral edge portion 52B of inner liner 24B. The peripheral edge portions 50B and 52B may comprise overlapping flanges that are pressed together by upper and lower tool fixtures 74, 72, respectively (FIG. 2) in a known manner.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vacuum insulated refrigerator door, comprising:
   a door wrapper having a peripheral edge;
   a door liner having a peripheral edge that is secured to the peripheral edge of the door wrapper;
   a vacuum insulated core comprising a permeable core material that is disposed inside an impermeable envelope, wherein the envelope has been evacuated to form a vacuum inside the envelope, and wherein the vacuum insulated core is sandwiched between the door wrapper and the door liner;
   a sheet of prefabricated compressible foam material disposed between the vacuum insulated core and at least one of the door wrapper and the door liner, wherein the sheet of compressible foam material has a uniform initial thickness prior to being compressed during assembly in at least one region due to a reduced spacing between the vacuum insulated core and at least one of the door wrapper and the door liner, and wherein the sheet of compressible foam material has a thickness in the at least one region that is less than the initial thickness.

2. The vacuum insulated refrigerator door of claim 1, wherein:
   the prefabricated compressible foam material is adhesively secured to at least one of the vacuum insulated core, the door liner, and the door wrapper by adhesive.

3. The vacuum insulated refrigerator door of claim 1, wherein:
   the vacuum insulated core includes a central portion and sidewalls extending transversely from the central portion.

4. The vacuum insulated refrigerator door of claim 3, wherein:
   the door liner includes a central portion and sidewalls extending transversely from the central portion, wherein the sidewalk of the door liner overlie the sidewalk of the vacuum insulated core.

5. The vacuum insulated refrigerator door of claim 4, wherein:
   the sidewalk of the vacuum insulated core define distal edges; and
   the sidewalls of the door liner have generally U-shaped portions that wrap around the distal edges.

6. The vacuum insulated refrigerator door of claim 3, wherein:
   the central portion of the vacuum insulated core includes a generally quadrilateral perimeter having four substantially linear sections;
   the vacuum insulated core includes four said sidewalls extending transversely from the four substantially linear sections of the vacuum insulated core.

7. The vacuum insulated refrigerator door of claim 6, wherein:
   a central portion of the door liner includes a generally quadrilateral perimeter having four substantially linear sections, the door liner including four sidewalls extending transversely from the four substantially linear sections adjacent the four sidewalls of the vacuum insulated core.

8. The vacuum insulated refrigerator door of claim 7, wherein:
   the sheet of compressible foam material includes a generally planar central portion disposed between the central portion of the vacuum insulated core and the central portion of the door liner, the sheet of compressible foam material further including four edge portions disposed between the four sidewalls of the vacuum insulated core and the four sidewalls of the liner.

9. The vacuum insulated refrigerator door of claim 8, wherein:
   the central portion of the vacuum insulated core and the four sidewalls of the vacuum insulated core have planar opposite surfaces.

10. The vacuum insulated refrigerator door of claim 9, wherein:
    the central portion of the vacuum insulated core and the four sidewalls of the vacuum insulated core have substantially uniform thickness.

11. The vacuum insulated refrigerator door of claim 9, wherein:
    the four sidewalls of the vacuum insulated core include tapered edge portions that are V-shaped in cross-section;
    the four sidewalk of the door liner each include portions that are generally V-shaped in cross-section and wrap around the tapered edge portions of the vacuum insulated core.

12. The vacuum insulated refrigerator door of claim 1, wherein:
    the sheet of prefabricated compressible foam material comprises a first sheet of compressible foam material disposed between, and in contact with, the vacuum insulated core and the door liner; and including:
    a second sheet of prefabricated compressible foam material disposed between, and in contact with, the vacuum insulated core and the door wrapper;
    and wherein neither of the first and second sheets of prefabricated compressible foam material comprise foamed in place material.

13. The vacuum insulated refrigerator door of claim 1, wherein:
    the at least one region of the sheet of compressible foam material that is compressed has a reduced thickness relative to a region of the sheet of compressible foam material that is not compressed.

14. The refrigerator door of claim 1, wherein:

the door wrapper and the door liner define an internal space, and the vacuum insulated core and the sheet of prefabricated compressible foam material are disposed in the internal space;

and wherein the internal space is free of foam that is foamed in place.

15. A vacuum insulated refrigerator door, comprising:

a door wrapper having a generally planar central portion and a peripheral edge;

a door liner having a generally planar central portion and sidewalls extending transversely from the central portion, the sidewalls forming a peripheral edge of the door liner that is secured to the peripheral edge of the door wrapper;

a vacuum insulated core comprising a permeable core material that is disposed inside an impermeable envelope, wherein the envelope has been evacuated to form a vacuum inside the envelope, and wherein a generally planar central portion of the vacuum insulated core is sandwiched between the generally planar central portion of the door wrapper and the generally planar central portion of the door liner and wherein: the vacuum insulated core includes four sidewalls extending transversely from the central portion of the vacuum insulated core;

a sheet of compressible foam material having a central portion disposed between at least the central portion of the vacuum insulated core and a generally planar central portion of at least one of the door wrapper and the door liner, wherein the central portion of the sheet of compressible foam material is compressed in at least one region due to a reduced spacing between the vacuum insulated core and at least one of the door wrapper and the door liner and wherein:

the liner includes four sidewalls overlying the four sidewalls of the vacuum insulated core; and the sheet of compressible foam material includes four edge portions disposed between the four sidewalk of the vacuum insulated core and the four sidewalk of the door liner.

16. The vacuum insulated refrigerator door of claim 15, wherein:

the central portion of the compressible foam material is adhesively secured to at least one of the vacuum insulated core, the door liner, and the door wrapper by an adhesive.

17. A refrigerator including:

an insulated cabinet having an opening;

a vacuum insulated refrigerator door movably connected to the insulated cabinet to selectively close off the opening when the vacuum insulated refrigerator door is in a closed position, the vacuum insulated refrigerator door comprising:

a door wrapper having a peripheral edge;

a door liner having a peripheral edge that is secured to the peripheral edge of the door wrapper;

a vacuum insulated core comprising a permeable core material that is disposed inside an impermeable envelope, wherein the envelope has been evacuated to form a vacuum inside the envelope, and wherein the vacuum insulated core is sandwiched between the door wrapper and the door liner;

a prefabricated sheet of compressible foam material disposed between the vacuum insulated core and at least one of the door wrapper and the door liner, wherein the sheet of compressible foam material is compressed in at least one region due to a reduced spacing between the vacuum insulated core and at least one of the door wrapper and the door liner, whereby the sheet of compressible foam material is compressed more in the at least one region than in a different region having greater spacing between the vacuum insulated core and the at least one of the door wrapper and the door liner.

18. The refrigerator of claim 17, wherein:

the compressible foam material is adhesively secured to at east one of the vacuum insulated core, the door liner, and the door wrapper.

19. The refrigerator door of claim 17, wherein:

the vacuum insulated core includes a central portion and sidewalk extending transversely from the central portion;

the door liner includes sidewalk overlying the sidewalls of the vacuum insulated core.

* * * * *